United States Patent [19]
Humphrey et al.

[11] Patent Number: 6,157,657
[45] Date of Patent: Dec. 5, 2000

[54] SYSTEM AND METHOD FOR DATA BUS INTERFACE

[75] Inventors: Russell L. Humphrey, McKinney; Jose A. Garcia, Rowlett; Long V. Vo, Garland, all of Tex.

[73] Assignee: Alcatel USA Sourcing, L.P., Plano, Tex.

[21] Appl. No.: 08/944,624

[22] Filed: Oct. 2, 1997

[51] Int. Cl.⁷ ..................................................... H04J 3/24
[52] U.S. Cl. ........................... 370/474; 370/419; 370/476
[58] Field of Search ..................................... 370/465, 466, 370/467, 470, 471, 472, 473, 474, 476, 389, 419

[56] References Cited

U.S. PATENT DOCUMENTS

| | | |
|---|---|---|
| 5,144,619 | 9/1992 | Munter ..................................... 370/353 |
| 5,173,901 | 12/1992 | DeSomer . |
| 5,293,570 | 3/1994 | Schmidt et al. ......................... 370/352 |
| 5,526,344 | 6/1996 | Diaz et al. . |
| 5,555,243 | 9/1996 | Kakuma et al. ......................... 370/352 |
| 5,568,475 | 10/1996 | Doshi et al. ............................. 370/399 |
| 5,570,355 | 10/1996 | Dail et al. ................................ 370/352 |
| 5,577,037 | 11/1996 | Takatori et al. ......................... 370/395 |
| 5,898,670 | 4/1999 | Hoebeke et al. ........................ 370/468 |

FOREIGN PATENT DOCUMENTS 9703526  1/1997  WIPO .

*Primary Examiner*—Ajit Patel
*Assistant Examiner*—Bob A. Phunkulh
*Attorney, Agent, or Firm*—Baker Botts L.L.P.

[57] ABSTRACT

A system for interfacing with a data bus is provided. The system includes an egress bus data interface that can receive a single incoming stream of STM data and ATM data. The egress bus data interface transmits a single incoming stream of STM data, and a single incoming stream of ATM. The system also includes an ingress bus data interface. The ingress bus interface receives a single outgoing stream of STM data and a single outgoing stream of ATM data. The STM data and ATM data are transmitted in a single outgoing stream.

4 Claims, 12 Drawing Sheets

PTI – PACKET TYPE INDICATOR   PV – PATH VERIFICATION BIT
RES – RESERVED                PAR – PARITY

SYSTEM AND METHOD FOR DATA BUS INTERFACE

TECHNICAL FIELD OF THE INVENTION

The present invention relates in general to telecommunications data switching and more particularly to a system and method for interfacing a telecommunications system component with a data bus.

BACKGROUND OF THE INVENTION

Modern telecommunications system typically utilize digitally encoded data instead of analog data. If analog data is used, it may be converted to digital data for the purposes of switching the data between conducting media.

Switching of data occurs at large telecommunications switches, which may receive and process hundreds or thousands of data channels.

In the process of being switched, digitally encoded data may be transferred over a data bus, which may be any data conductor that allows two or more components to receive and transmit data. For example, where two or more components are connected to a bus, only one component may be transmitting data over the bus, but all other components may be receiving data from the bus. Data buses offer various advantages, but generally require all of the data that is being transmitted over the data bus to be in a single predetermined data format.

For example, a data bus may typically only carry synchronous transfer mode data or asynchronous transfer mode data. Synchronous transfer mode ("STM") data is characterized by a constant rate data stream that does not contain routing information. Asynchronous transfer mode ("ATM") data is characterized by a variable rate data stream that includes predetermined packets of information. Contained within each packet is routing information that is used to determine which packets belong to a given data stream.

Known data bus interfaces impose limitations on the ability to use different data formats on the same data bus. These known data bus Interfaces limit the use of data buses in telecommunications components such as telecommunications switches.

SUMMARY OF THE INVENTION

Therefore, a need has arisen for a system and apparatus for a data bus interface that allows the reception and transmission of data over a data bus to be precisely controlled.

In accordance with the present invention, a system and circuit for a data bus interface is provided that substantially eliminates or reduces disadvantages and problems associated with previously developed data bus interfaces.

One aspect of the present invention is a system for interfacing with a data bus. The system includes an egress bus data interface that can receive a single incoming stream of STM data and ATM data. The egress bus data interface transmits a single incoming stream of STM data, and a single incoming stream of ATM. The system also includes an ingress bus data interface. The ingress bus interface receives a single outgoing stream of STM data and a single outgoing stream of ATM data. The STM data and ATM data are transmitted in a single outgoing stream.

The present invention provides many important technical advantages. One important technical advantage of the present invention is a system for interfacing with a data bus that allows synchronous transfer mode data and asynchronous transfer mode data to be transmitted over one bus. The data bus interface of the present invention can separate the synchronous transfer mode data and asynchronous transfer mode data from a single data stream, and may combine a synchronous transfer mode data stream and an asynchronous transfer mode data stream into a single data stream.

Another important technical advantage of the present invention is a method for interfacing with a data bus that allows synchronous transfer mode data and asynchronous transfer mode data to be transmitted over one bus. The method for interfacing with a data bus of the present invention separates the synchronous transfer mode data and asynchronous transfer mode data from a single data stream, and combine a synchronous transfer mode data stream and an asynchronous transfer mode data stream into a single data stream.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Preferred embodiments of the present invention are illustrated in the figures, like numbers being used to refer to like and corresponding parts of the various drawings.

Figure 1:
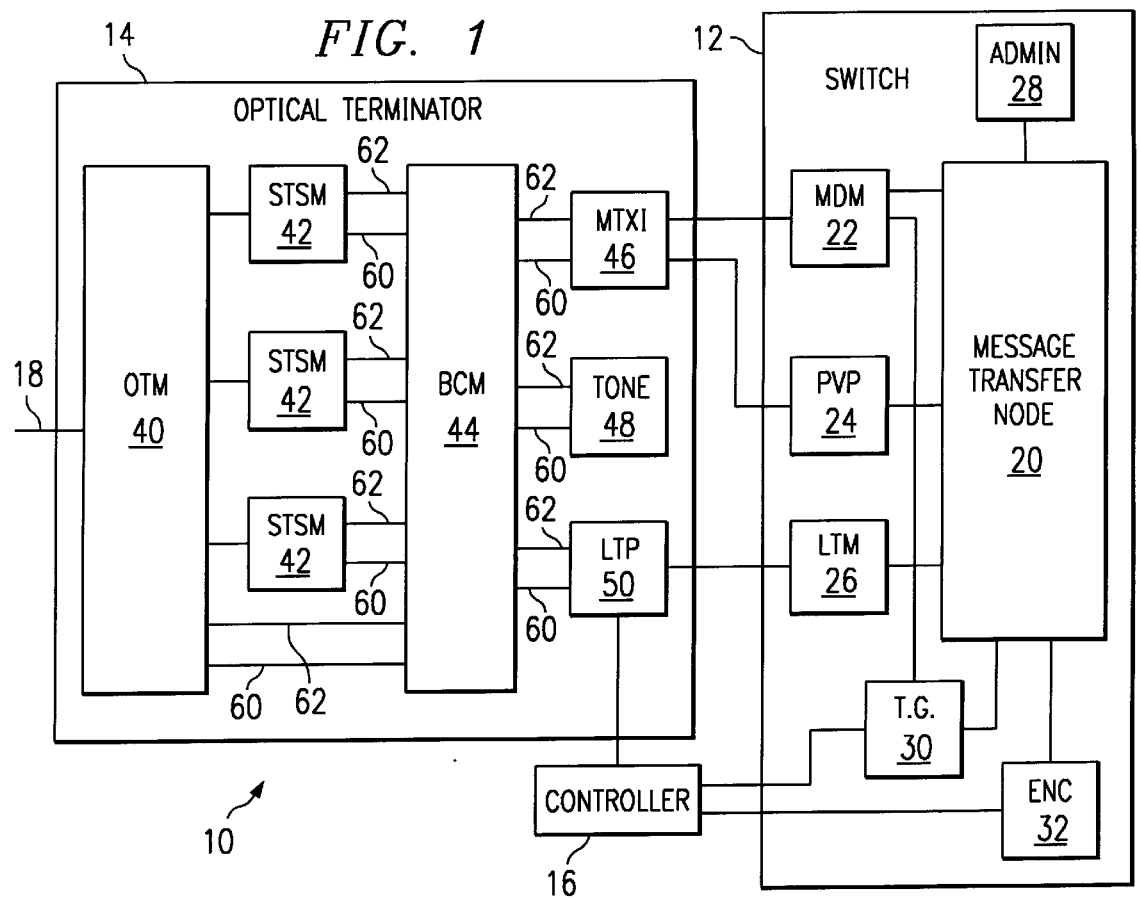
FIG. 1 is a block diagram of an optical fiber-capable telecommunications switch system embodying concepts of the present invention.

FIG. 1 is a block diagram of optical fiber-capable telecommunications switch system 10 embodying concepts of the present invention. In particular, the data bus interface of the present invention is a modular system designed for incorporation into individual telecommunications components, such as the individual components of telecommunications switch system 10. The data bus interface of the present invention may also or alternatively be used in other telecommunications components that interface to data buses.

Optical fiber-capable telecommunications switch system 10 includes switch 12 connected to fiber optic connection unit (OPTICAL TERMINATOR) 14 and common controller 16. Optical telecommunications data streams, such as one or more streams of bit-serial data, byte-serial data, or serial frames of data, are received over one or more fiber optic conductors 18 at fiber optic connection unit 14. These telecommunications data streams are converted to electrical signals by fiber optic connection unit 14 and are transmitted to switch 12 for switching between data channels. Switch 12 may switch data channels of any suitable size, such as DS-0, DS-1, DS-3, or other suitable channels. Furthermore, any stream of data may comprise one or more channels of data having a suitable format, such as DS-0, DS-1, DS-3, or other suitable channels. Common controller 16 receives control data from and transmits control data to fiber optic connection unit 14 and switch 12.

Switch 12 is a telecommunications switch having M input channels and N output channels, where M and N are integers. Switch 12 receives telecommunications data at any of the M input channels and transfers the telecommunications data to any of the N output channels. Switch 12, as shown in FIG. 1, is a digital switch, but may also be an analog switch. Switch 12 may include, for example, a Megahub 600E Digital Telecommunications Switch manufactured by DSC Communications Corporation of Plano, Texas. Switch 12 includes a message transport node 20 coupled to a matrix data multiplexer circuit (MDM) 22, a matrix control path verification processor (PVP) 24, a line trunk manager circuit (LTM) 26, administration circuit (ADMIN) 28, timing generator circuit (TG) 30, and Ethernet network circuit (ENC) 32.

Matrix data multiplexer circuit 22 is further coupled to matrix control path verification processor 24 and timing generator circuit 30. Matrix data multiplexer circuit 22 is an interface circuit that may be used for coupling data channels between fiber optic connection unit 14 and the switching matrix (not explicitly shown) of switch 12. In particular, matrix data multiplexer circuit 22 provides the interface for DS-0 data. Matrix data multiplexer circuit 22 receives 2048 channels of DS-0 data from fiber optic connection unit 14 on a 10-bit parallel data channel operating at a frequency of 16.384 MHZ. Any suitable number of channels, data channel format or operating frequency may be used. These DS-0 data channels are then transmitted to the M input ports of the switching matrix of switch 12.

Control commands received at switch 12 from common controller 16 are used to determine the proper connections between the M input ports and the N output ports of the switching matrix. The DS-0 data channels are transmitted through the switching matrix after the connections have been formed. The DS-0 data channels received at matrix data multiplexer circuit 22 from the N output ports of the switching matrix are then transmitted back to fiber optic-connection unit 14.

Matrix control path verification processor 24 is coupled to fiber optic connection unit 14 and to message transport node 20. Matrix control path verification processor 24 is a switching matrix administration and control component that processes matrix channel low level fault detection and fault isolation data.

Line trunk manager circuit 26 is coupled to fiber optic connection unit 14 and message transport node 20. Line trunk manager circuit 26 is a switching matrix control component that receives and transmits data relating to call processing functions for fiber optic connection unit 14.

Timing generator circuit 30 is coupled to matrix data multiplexer circuit 22, message transport node 20, and common controller 16. Timing generator circuit 30 is a switch timing circuit that receives timing data from an external source, such as fiber optic connection unit 14, and transmits the timing data to components of switch 12.

Ethernet network circuit 32 is coupled to message transport node 20 and common controller 16. Ethernet network circuit 32 is a data communications interface, and transfers data between message transport node 20 and common controller 16.

Fiber optic connection unit 14 includes an optical interface circuit (OTM) 40, STSM circuits (STSM) 42, a bus control circuit (BCM) 44, a matrix interface circuit (MTXI) 46, a tone recognition circuit (TONE) 48, and a high speed line trunk processor circuit (LTP) 50. Fiber optic connection unit 14 receives digitally encoded optical data from fiber optic conductor 18, performs broadcast switching of the data streams received from fiber optic conductor 18, transmits synchronous transfer mode (STM) telecommunication data to matrix data multiplexer circuit 22 and matrix control path verification processor 24 for switching through the switching matrix of switch 12, and receives the switched telecommunications data from switch 12 for transmission over fiber optic conductor 18.

Optical interface circuit 40 is capable of terminating optical signals, for example OC-3, connected to the public switched network (PSN). Optical interface circuit 40 receives digitally encoded optical telecommunications data from fiber optic conductor 18 and converts the optical signals into electrical signals, for example STS-1, for transmission to other components of fiber optic connection unit 14. Optical interface circuit 40 is coupled to fiber optic conductor 18, bus control circuit 44, and to STSM circuits 42. Optical interface circuit 40 may comprise a single circuit card with electronic circuit subcomponents (not explicitly shown) that has plug-in connectors to allow the card to be easily installed in a cabinet containing other component circuit cards of fiber optic connection unit 14. Alternatively, optical interface circuit 40 may comprise two or more circuit cards, or one or more discrete components on a circuit card.

Application circuits are generally any telecommunications data transmission system components which are coupled to bus control circuit 44. Each application circuit may comprise a separate circuit card (not explicitly shown) with plug-in connectors in order to be easily installed in a rack containing fiber optic connection unit 14. Alternatively, each application circuits may comprise multiple circuit cards, or individual components on a single circuit card.

As shown in FIG. 1, STSM circuits 42 are configured to receive data from and transmit data to optical interface circuit 40. This data may comprise synchronous transfer mode telecommunications data. For example, STSM circuits 42 may receive a single STS-LP channel of data that includes a plurality of DS-0 data channels, where each DS-0 data channel is a continuous stream of data equal to 64,000 bits per second. This data would be received in a predetermined format that may include administration data, control data, routing data, and payload data. The administration data, control data, and routing data is used to separate the individual DS-0 data channels within the STS-1P data channel, and the payload data comprises the actual data carried in each individual DS-0 data channel.

STSM circuits 42 may also receive asynchronous transfer mode (ATM) telecommunications data. Asynchronous transfer mode data may be transmitted as a single stream of fixed bit format data frames that comprise additional streams of data. The number of data frames transmitted per second for a given data stream may be varied for asynchronous transfer mode data in order to accommodate fluctuations in the amount of data per stream and the number of data streams transferred.

Bus control circuit 44 may be coupled to a number of other application circuits with suitable functions, such as matrix interface circuit 46, tone recognition circuit 48, and high speed line trunk processor circuit 50. One common characteristic of all application circuits is that they transmit data to bus control circuit 44 over ingress buses 60 and receive data from bus control circuit 44 over egress buses 62.

Bus control circuit 44 receives telecommunications data from application circuits over ingress buses 60, multiplexes the data into a single broadcast data stream, and transmits the broadcast data stream over egress buses 62. In this manner, bus control circuit 44 also operates as a broadcast switching device. Each application circuit receives the broadcast data stream containing data from other application circuits, and can process selected data in a suitable manner. For example, STSM circuit 42 may transmit the data back to optical interface circuit 40 for transmission on fiber optic conductor 18 to the network. Bus control circuit 44 may comprise a separate circuit card with plug-in connectors in order to be easily used in a rack containing fiber optic connection unit 14. Alternatively, bus control circuit 44 may comprise multiple circuit cards, or individual components on a single circuit card.

Matrix interface circuit 46 provides the protocol and transport format conversion between fiber optic connection unit 14 and switch 12. Matrix interface circuit 46 is an application circuit that selects desired data channels from the broadcast data stream transmitted by bus control circuit 44, and reformats and transmits the data to switch 12. Matrix interface circuit 46 is coupled to bus control circuit 44, matrix data multiplexer circuit 22, and matrix control path verification processor 24. Matrix interface circuit 46 converts the data format of the broadcast data stream received from bus control circuit 44 and switch 12 into a data format that is compatible with switch 12 and bus control circuit 44, respectively. Matrix interface circuit 46 may comprise a separate circuit card with plug-in connectors in order to be easily used in a rack containing fiber optic connection unit 14. Alternatively, matrix interface circuit 46 may comprise multiple circuit cards, or individual components on a single circuit card.

Tone recognition circuit 48 is an application circuit that is coupled to bus control circuit 44 and performs tone recognition functions for fiber optic connection unit 14. One pair of tone recognition circuits 48 may be required for every 2016 matrix ports of switch 12. Tone recognition circuit 48 interfaces with the broadcast data stream and detects data representative of keypad tones on each DS-0 channel that comprises the broadcast data stream, up to, for example, 2016 DS-0 data channels.

Tone recognition circuit 48 has an array of digital signal processor devices (not explicitly shown) that can be configured to provide tone detection and generation. Alternatively, other methods of tone detection and generation may be used. Tone recognition circuit 48 may comprise a separate circuit card with plug-in connectors in order to be easily used in a rack containing fiber optic connection unit 14. Alternatively, tone recognition circuit 48 may comprise multiple circuit cards, or individual components on a single circuit card. The array of digital signal processors may also be used for other suitable purposes, such as echo cancellation.

High speed line trunk processor circuit 50 is the primary shelf controller for all of the circuit cards in fiber optic connection unit 14 and provides the interface between fiber optic connection unit 14 and switch 12. High speed line trunk processor circuit 50 contains a microprocessor and a communications interface to line trunk manager circuit 26.

High speed line trunk processor circuit 50 may comprise a separate circuit card with plug-in connectors in order to be easily used in a rack containing fiber optic connection unit 14. Alternatively, high speed line trunk processor circuit 50 may comprise multiple circuit cards, or individual components on a single circuit card.

Ingress buses 60 are data buses that carry a data stream with a predetermined bit structure and a predetermined frequency from an application circuit to bus control circuit 44. For example, each ingress bus 60 may comprise a data stream with 8 parallel bits operating, for example, at a frequency of 25.92 MHZ. Other bit structures and frequencies may be used where suitable.

Egress buses 62 are data buses that carry a data stream with a predetermined bit structure and a predetermined frequency to an application circuit from bus control circuit 44. For example, each egress bus 62 may comprise a data stream with 16 parallel bits operating, for example, at a frequency of 51.84 MHZ. Other bit structures and frequencies may be used where suitable.

Common controller 16 is coupled to switch 12 and fiber optic connection unit 14. Common controller 16 is a processor that receives administration, control, and routing data from switch 12 and fiber optic connection unit 14, and generates administration, control and routing data that coordinates the operation of switch 12 and fiber optic connection unit 14. Common controller 16 may alternatively be incorporated within switch 12 or fiber optic connection unit 14.

In operation, telecommunications data from the network is transmitted via fiber optic conductor 18 and received by fiber optic connection unit 14. This telecommunications data is then converted into electrical signals and transmitted through optical interface circuit 40 through STSM circuit 42 and to bus control circuit 44 over ingress bus 60. Bus control circuit 44 multiplexes the data received from each application circuit into a single data stream and broadcasts the data stream over each egress bus 62.

The broadcast data is transmitted to switch 12 through matrix interface circuit 46, where switching is performed on individual data channels. The data is then transmitted back to bus control circuit 44, where it is multiplexed into the broadcast data stream. The broadcast data stream is received at STSM circuits 42 for retransmission through fiber optic conductor 18 via optical interface circuit 40. The broadcast data may also or alternatively be transmitted to matrix interface circuit 46, tone recognition circuit 48, high speed line trunk processor circuit 50, or other suitable circuits for suitable data processing.

Figure 2:
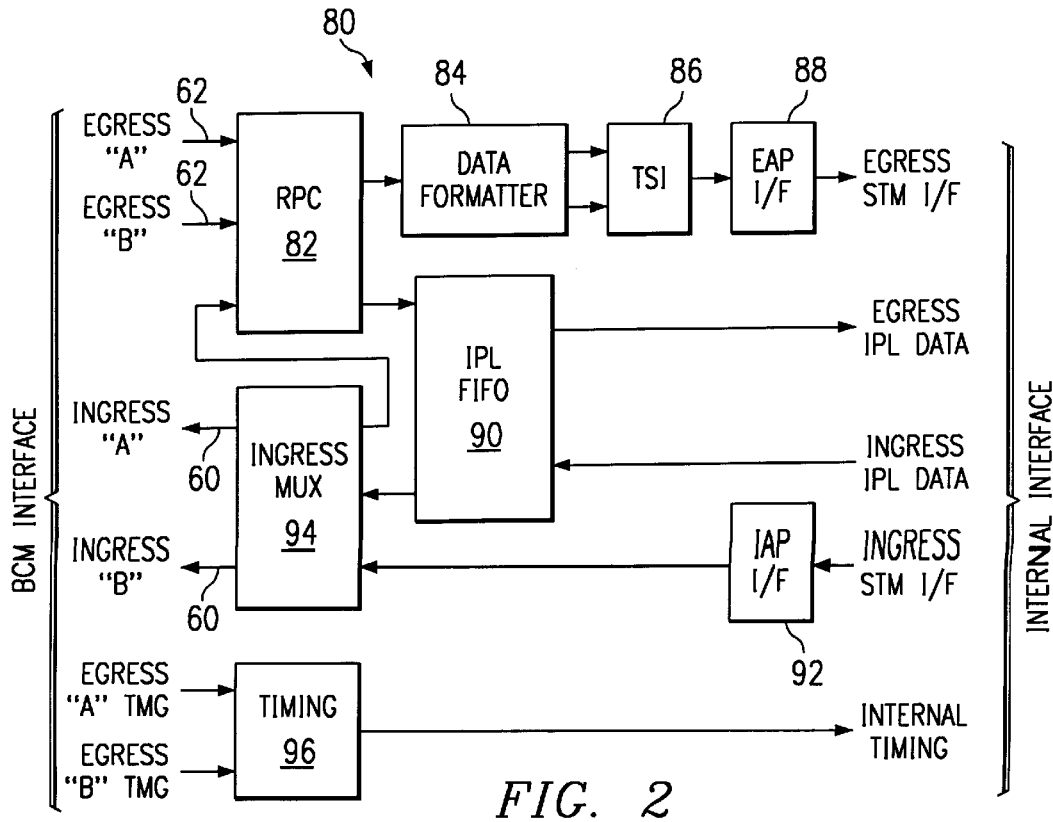
FIG. 2 is a block diagram of a bus interface system embodying concepts of the present invention.

FIG. 2 is a block diagram of bus interface system 80 embodying concepts of the present invention. Bus interface system 80 is typically a component of an application circuit, such as STSM circuits 42, matrix interface circuit 46, tone recognition circuit 48, optical interface circuit 40, or high speed line trunk processor circuit 50, and is used to interface the application circuit to ingress buses 60 and egress buses 62. In particular, bus interface system 80 is configured as a modular circuit for incorporation in an application circuit, with predetermined interfaces that allow the bus interface system 80 to be easily incorporated into any of the application circuit cards. Alternatively, bus interface system 80 may comprise a separate circuit card with plug-in connectors in order to be easily used in a rack containing fiber optic connection unit 14, as multiple circuit cards, or as individual components on a single circuit card. Bus interface system 80 may also comprise additional discrete components or a single component such as an application-specific integrated circuit.

Bus interface system 80 receives incoming synchronous transfer mode data and incoming asynchronous transfer mode data over egress buses 62, and separates the synchronous transfer mode data from the asynchronous transfer mode data. The synchronous transfer mode data and asynchronous transfer mode data are then transmitted to the application circuit associated with the bus interface system 80. Bus interface system 80 also receives synchronous transfer mode data and asynchronous transfer mode data from an application circuit and combines the data into a single data stream for transmission over ingress buses 60.

Bus interface system 80 includes redundant path combiner circuit 82, which couples to egress buses 62, data formatter circuit 84, buffer circuit 90, and ingress multiplexer circuit 94. Redundant path combiner circuit 82 is a telecommunications data processing circuit that may comprise components such as data buffers, field programmable gate arrays (FPGAs), application-specific integrated circuits, and other suitable components. Redundant path combiner circuit 82 may incorporate, for example, a field programmable gate array manufactured by Xilinx Corporation.

Redundant path combiner circuit 82 receives a single data stream from each egress bus 62 having a 16-bit parallel structure and operating, for example, at 51.84 MHz. Other suitable bit structures and operating frequencies may also be used. The single data stream includes synchronous transfer mode data and asynchronous transfer mode data. Redundant path combiner circuit 82 separates the incoming synchronous transfer mode data from the incoming asynchronous transfer mode data. The incoming synchronous transfer mode data is transmitted in a single 36-bit parallel data stream operating, for example, at 25.92 MHz to data formatter circuit 84. Other suitable bit structures and operating frequencies may be used. The incoming asynchronous transfer mode data is transmitted in a single 33-bit parallel data stream operating, for example, at 25.92 MHz to buffer circuit 90. Other suitable bit structures and operating frequencies may be used.

Redundant path combiner circuit 82 also selects between redundant incoming data streams received from egress buses 62. For example, egress buses 62 may comprise redundant A and B planes of identical incoming data streams. Redundant path combiner circuit 82 selects either the A plane egress bus 62 or the B plane egress bus 62, based upon such factors as data content, error content, system preset values, or external routing control commands. This selection is made on a bus slot by bus slot basis. The selection process for asynchronous transfer mode data and synchronous transfer mode data is performed independently, so that one of the redundant planes may be selected for the synchronous transfer mode data and a different redundant plane may be selected for the asynchronous transfer mode data.

Data formatter circuit 84 is a telecommunications data processing circuit that is coupled to redundant path combiner circuit 82 and time slot interchange switch circuit 86. Data formatter circuit 84 may comprise a field programmable gate array such as a Xilinx field programmable gate array, serial first-in/first-out buffer circuit, an application-specific integrated circuit, and other suitable circuitry.

Data formatter circuit 84 reformats data from a synchronous transfer mode subframe data format into a DS-0 channel data format. Data formatter circuit 84 receives a 36-bit parallel data stream operating, for example, at 32.768 MHz that include a 32-bit data package, a start of packet bit, a start-of-frame bit, an end-of-frame indicator, and a parity bit. Other suitable bit structures and operating frequencies may be used. This 36-bit data stream is alternately written into one of two first-in, first-out buffers, on a packet-by-packet basis. Two 36-bit data streams are read out of the first-in, first-out buffers simultaneously. On each 36-bit data stream read out of the first-in, first-out buffers, data formatter circuit 84 performs even parity verification over each 32-bit data word, and strips off subframe headers and CRC-8 data from the synchronous transfer mode subframe data format. Data formatter circuit 84 then reformats each 32-bit data stream from a 32-bit parallel data stream to a 10-bit parallel data stream including one or more DS-0 data channels.

For each DS-0 data channel, data formatter circuit 84 generates the parity for the eight bit pulse code modulated data and the one bit path verification data. The parity bit is appended to the pulse code modulated data and the path verification bit to form a 10-bit parallel DS-0 data channel. Idle data patterns are used to fill out any DS-0 data channels that are unused out of each of the pair of 4,096 DS-0 data channels output from data formatter circuit 84 to time slot interchange switch circuit 86. Data formatter circuit 84 then generates a pair of continuous 10-bit parallel data streams operating, for example, at 32.768 MHz, which are transmitted to time slot interchange switch circuit 86. Other suitable bit structures and operating frequencies may be used.

Time slot interchange switch circuit 86 is a time slot interchange digital switch having 8,192 input ports and 4,096 output ports. Time slot interchange switch circuit 86 receives data over two 10-bit parallel data streams operating, for example, at 32.768 MHz from data formatter circuit 84. Other suitable bit structures and operating frequencies may be used. This data is sequentially written to random access memory of time slot interchange switch circuit 86, which may create a delay for data transmitted through time slot interchange switch circuit 86.

Time slot interchange switch circuit 86 also interfaces to an onboard controller circuit associated with the application circuit associated with bus interface system 80 (not explicitly shown). The onboard controller circuit includes a resident microprocessor that performs management and control functions. Control commands transmitted to time slot interchange switch circuit 86 are used to determine the sequence in which data is read from the random access memory of time slot interchange switch circuit 86. Time slot interchange switch circuit 86 outputs a 10-bit parallel data stream operating, for example, at 32.768 MHZ to egress application interface circuit 88. Other suitable bit structures and operating frequencies may be used.

Egress application interface circuit 88 is a telecommunications data processing device that couples to time slot interchange switch circuit 86. Egress application interface circuit 88 receives up to 4,096 10-bit DS-0 data channels from time slot interchange switch circuit 86, and verifies the parity of each DS-0 data channel.

Egress application interface circuit 88 also extracts the path verification bit for each 10-bit DS-0 data sample channel, and performs path verification checks for each egress application stream. The path verification bit is a predetermined bit in each 10-bit DS-0 data sample channel that may be used to determine and verify path data for the DS-0 data channel. If a path verification error occurs, egress application interface circuit 88 reports the path verification error to the onboard controller circuit. Egress application interface circuit 88 strips the path verification bit from each sample and regenerates parity data for the 8-bit parallel data.

The new parity bit for the 8-bit parallel data is appended to the 8-bit stream to form a 9-bit stream. Egress application interface circuit 88 transmits the 9-bit parallel data stream to application circuits at a speed determined by the application circuit.

Asynchronous transfer mode data is transmitted from redundant path combiner circuit 82 to buffer circuit 90. The asynchronous transfer mode data is received in an iMPAX packet layer datagram format, which is a proprietary asynchronous transfer mode data format, over a 33-bit parallel stream at a rate of 25.92 MHZ. Buffer circuit 90 stores the data received from redundant path combiner circuit 82 and transmits a 33-bit parallel data stream to the attached application circuit at a speed of up to 66.7 MHZ.

Buffer circuit 90 also receives outgoing asynchronous transfer mode data from the application circuits from a 9-bit parallel data stream operating, for example, at the application circuit's processor clock rate. Other suitable bit structures and operating frequencies may be used. Buffer circuit 90 transmits the received outgoing asynchronous transfer mode data from the application circuits under control of the ingress multiplexer to ingress multiplexer circuit 94 in a 9-bit parallel data stream operating, for example, at 25.92 MHZ. Other suitable bit structures and operating frequencies may be used.

Ingress application interface circuit 92 is a telecommunications data processing device, and may comprise data processing equipment such as an Altera field programmable gate array. Up to 2048 DS-0 channels of outgoing synchronous transfer mode data is received from an application circuit at ingress application interface circuit 92 in a 9-bit parallel data stream operating, for example, at the ingress application data rate. Other suitable bit structures and operating frequencies may be used. Ingress application interface circuit 92 verifies the parity of the data and generates a path verification bit stream for each DS-0 channel. Ingress application interface circuit 92 then generates parity over the 8-bit parallel data and the path verification bit, and concatenates the 8-bit parallel data, the path verification bit, and the parity bit to form a 10-bit data sample.

Ingress multiplexer circuit 94 receives outgoing asynchronous transfer mode data from buffer circuit 90, and outgoing synchronous transfer mode data from ingress application interface circuit 92. Ingress multiplexer circuit 94 combines the outgoing synchronous transfer mode data and the outgoing asynchronous transfer mode data into an 8-bit parallel data stream operating, for example, at 25.92 MHZ. Other suitable bit structures and operating frequencies may be used. Ingress multiplexer circuit 94 transmits the multiplexed outgoing data over ingress buses 60 and to redundant path combiner circuit 82.

Timing circuit 96 receives either egress timing signals or external timing signals and synchronizes the internal phase lock loop with the selected timing signal. Internal timing reference signals are generated by timing circuit 96. Timing circuit 96 also synchronizes to the A plane timing signal, the B-plane timing signal, or internal timing signals, either automatically or in response to user-entered commands.

In operation, incoming synchronous transfer mode data and incoming asynchronous transfer mode telecommunications data is received in a pair of redundant 16-bit parallel data streams over egress buses 62 at bus interface circuit 80, and is transmitted to the application circuit associated with bus interface circuit 80. Bus interface circuit 80 also receives outgoing synchronous and outgoing asynchronous data from application circuits and combines the synchronous and asynchronous transfer mode data into a single data stream. This single data stream is then transmitted over ingress buses 60.

Figure 3:
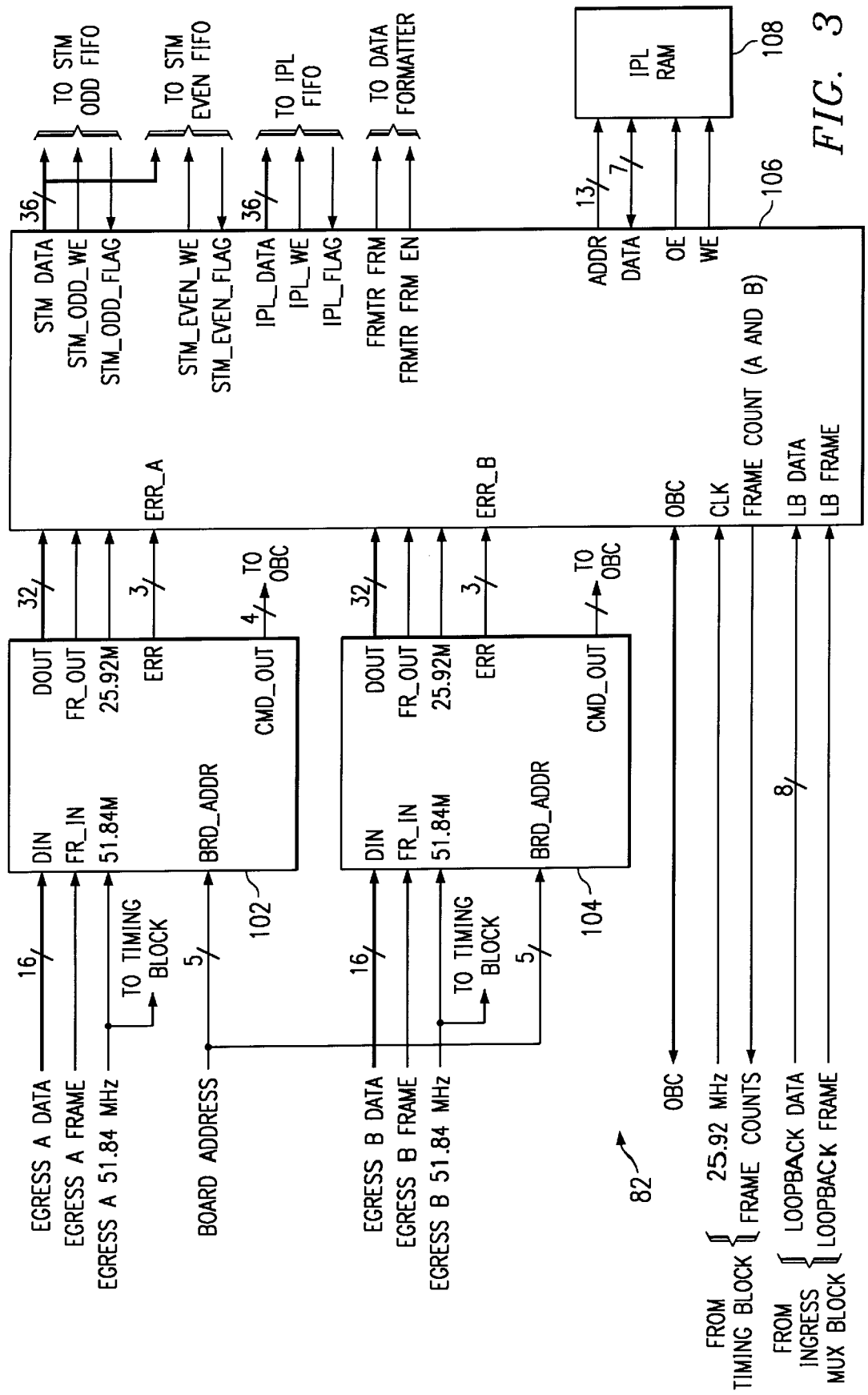
FIG. 3 is a block diagram of a redundant path combiner circuit embodying concepts of the present invention.

FIG. 3 is a diagram of redundant path combiner circuit 82 embodying concepts of the present invention. Redundant path combiner circuit 82 comprises egress front end processor A plane 102, egress front end processor B plane 104, field programmable gate array 106, and iMPAX packet layer random access memory 108. Alternatively, redundant path combiner circuit 82 may comprise additional discrete components or a single component, such as an application-specific integrated circuit.

Egress front end processor A plane 102 and egress is front end processor B plane 104 are redundant devices that are each coupled to one of the egress buses 62. Egress buses 62 each transmit a 16-bit parallel data stream operating, for example, at 51.84 MHZ, a single bit egress frame stream, and a single bit 51.84 MHZ clock stream. Egress front end processor A plane 102 and B plane 104 also receive board address input bits.

Egress front end processor A plane 102 and B plane 104 each output a 32-bit parallel data stream operating, for example, at 25.92 MHZ to field programmable gate array 106. Other suitable bit structures and operating frequencies may be used. In addition, egress front end processor A plane 102 and B plane 104 output a single bit frame stream, a 25.92 MHZ clock signal stream, and an error signal stream. Egress front end processor A plane 102 and B plane 104 also put out a command output stream to the onboard controller circuit (not explicitly shown), by decoding and validating hardware command codes extracted from the egress frame headers.

Field programmable gate array 106 extracts frame header data from the A and B plane egress frame data, extracts synchronized A and B frame count fields from the header data, and validates iMPAX packet layer data packets and synchronous transfer mode subframe data packets on a packet by packet basis. Field programmable gate array 106 selects either the A plane or the B plane to be the primary data plane on a slot by slot basis. This selection may be made independently for both the synchronous transfer mode data and the asynchronous transfer mode data.

iMPAX packet layer random access memory 108 is a suitable random access memory device that is used to store iMPAX packet layer configuration data. iMPAX packet layer configuration data is used to validate incoming iMPAX packet layer data packets, for example, to verify that they are addressed to the local application card. iMPAX packet layer random access memory 108 is coupled to field programmable gate array 106.

Data received at field programmable gate array 106 is separated into synchronous and asynchronous transfer mode data. Selected synchronous transfer mode data is transmitted to a first-in/first-out buffer, where it is stored for subsequent transmission to data formatter circuit 84. Selected asynchronous transfer mode data is transmitted to buffer circuit 90.

Figure 4:
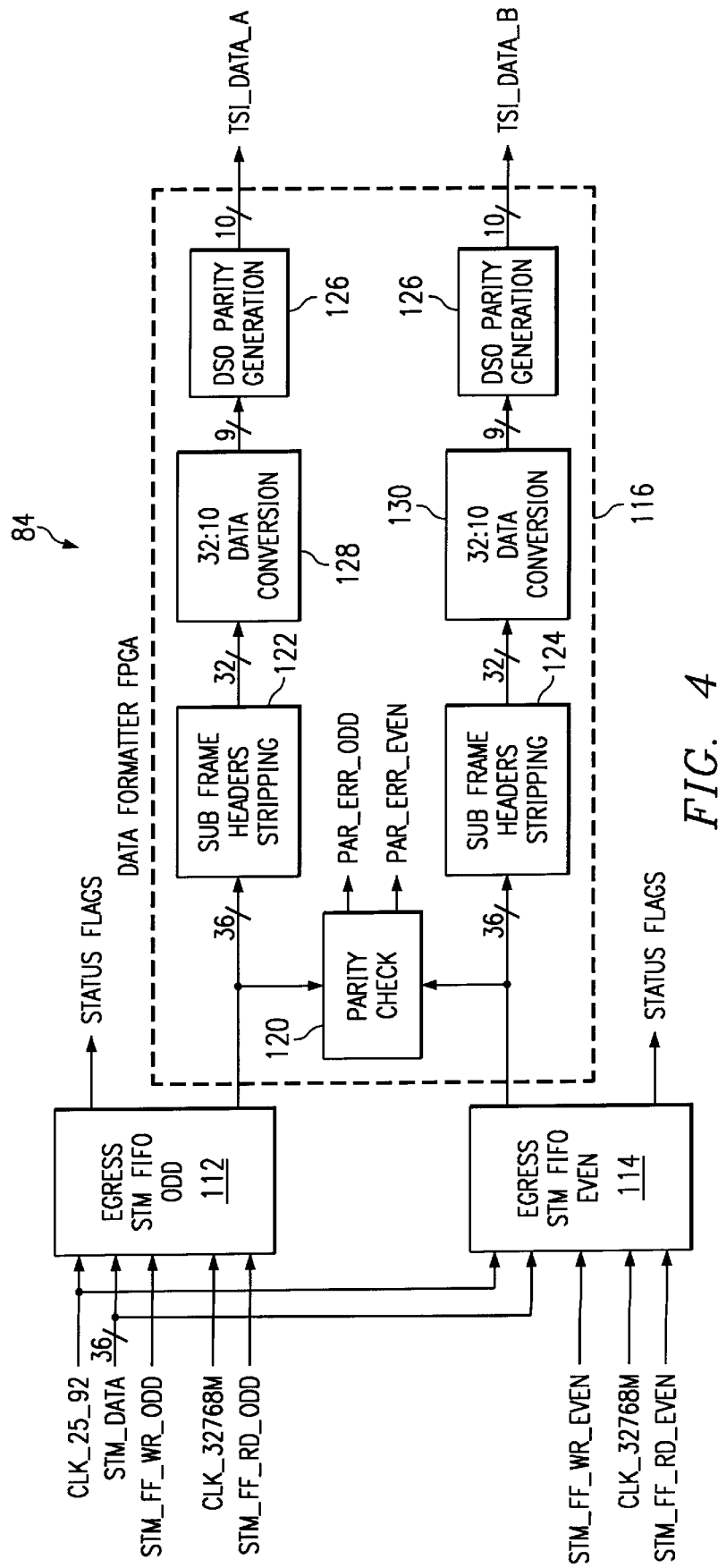
FIG. 4 is a block diagram of a data formatter circuit embodying concepts of the present invention.

FIG. 4 is a block diagram of data formatter circuit 84 embodying concepts of the present invention. Data formatter circuit 84 includes first-in/first-out buffer 112, first-in/first-out buffer 114, and data formatter field programmable gate array 116. Data formatter field programmable gate array 116 is broken down further into functional blocks, which are programmed functions within data formatter field programmable gate array 116. These functional blocks include parity check circuit 120, frame header extraction circuits 122 and 124, DS-0 parity generation circuit 126, and data conversion circuits 128 and 130. Alternatively, data formatter circuit 84 may comprise additional discrete components or a single component, such as an application-specific integrated circuit.

First-in/first-out buffers 112 and 114 each receive a 36-bit parallel data stream of synchronous transfer mode data, in addition to a clock stream. A status flag stream is also generated by first-in/first-out buffers 112 and 114 and monitored by redundant path combiner circuit 82. Synchronous transfer mode data packets are transmitted alternating on an even and odd subframe basis into first-in/first-out buffers 112 and 114 in response to control commands received from redundant path combiner circuit 82. The two data frames are read simultaneously. As each data stream is read from first-in, first-out buffers 112 and 114, a parity check is performed by parity check circuit 120.

Subframe headers are stripped off of the synchronous transfer mode data subframes by subframe header stripping circuits 122 and 124. Data conversion circuits 128 and 130 each receive the 32-bit parallel synchronous transfer mode data after the frame header is stripped off and reformat the synchronous transfer mode data into DS-0 format data. DS-0 parity generation is performed by DS-0 parity generation circuit 126. This DS-0 format data is transmitted in a 10-bit parallel data stream from data formatter circuit 84.

Figure 5:
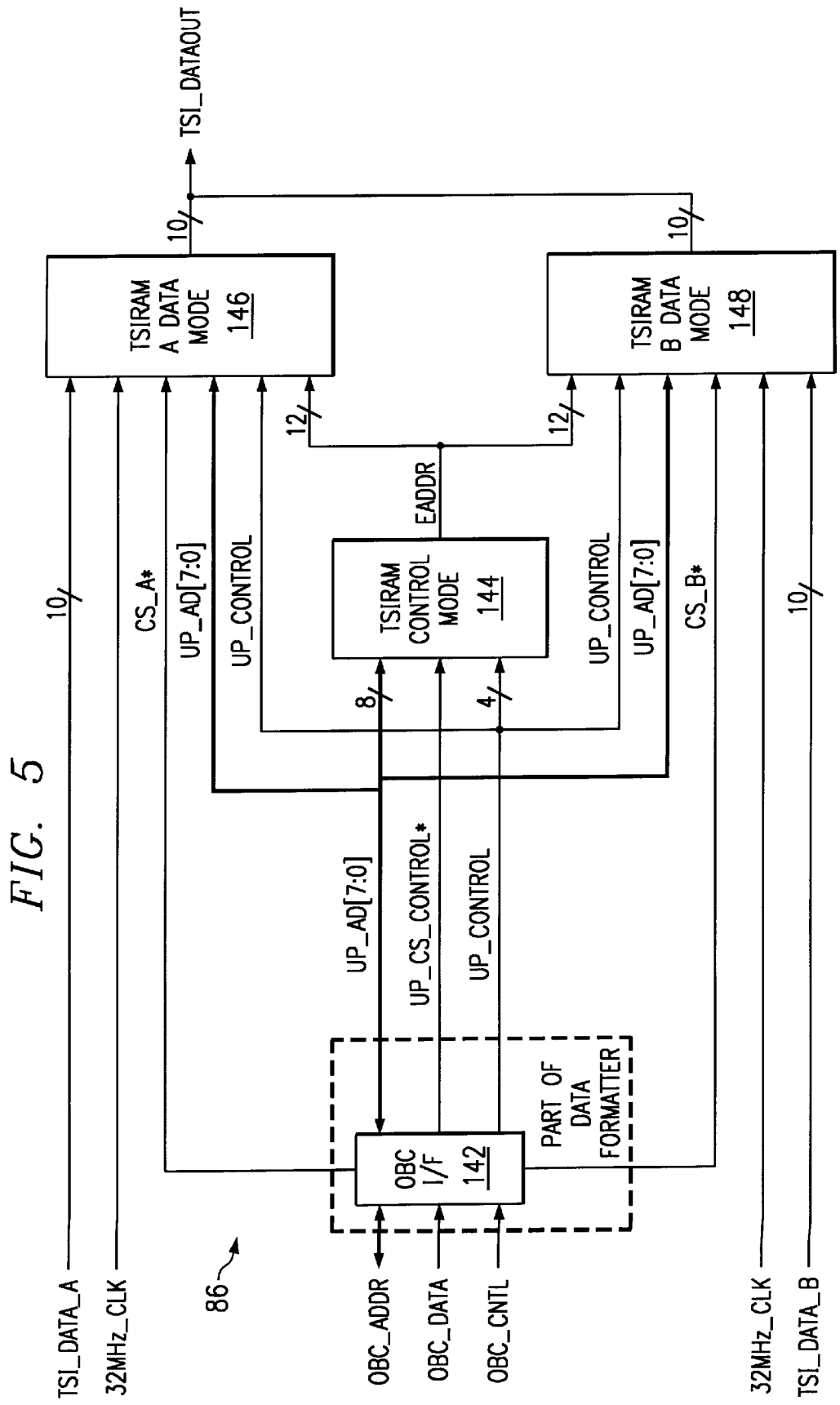
FIG. 5 is a block diagram of time slot interchange switch circuit embodying concepts of the present invention.

FIG. 5 is a block diagram of time slot interchange switch circuit 86 embodying concepts of the present invention. Time slot interchange switch circuit 86 includes onboard controller interface circuit 142 (which is physically part of data formatter field programmable gate array 116 of FIG. 4), time slot interchange random access memory control mode circuit 144, and time slot interchange random access memory data mode circuits 146 and 148.

The DS-0 synchronous transfer mode data channels transmitted from data formatter circuit 84 of FIG. 4 are received at time slot interchange random access memory data mode circuits 146 and 148. This data is sequentially stored in time slot interchange random access memory locations.

Time slot interchange random access memory control mode circuit 144 receives control data from onboard controller interface circuit 142. The data is used to switch the DS-0 data channels by selecting the order in which data is read from the random access memory locations of time slot interchange random access memory data mode circuits 146 and 148.

Figure 6:
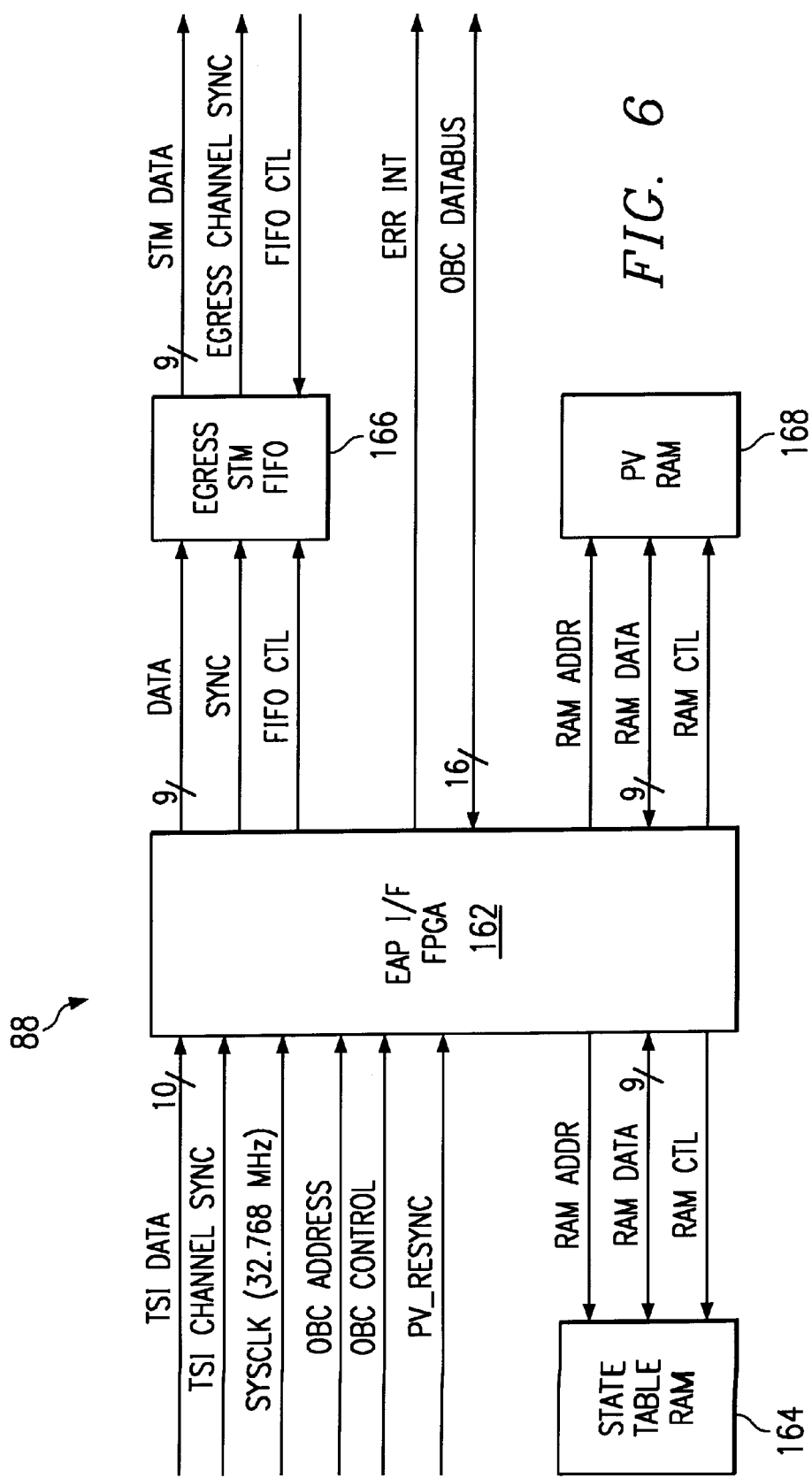
FIG. 6 is a block diagram of egress application interface circuit embodying concepts of the present invention.

FIG. 6 is a block diagram of egress application interface circuit 88 embodying concepts of the present invention. Egress application interface circuit 88 is a telecommunications data processing device, such as an Altera field programmable gate array, or other suitable field programmable gate arrays. Egress application interface circuit 88 includes field programmable gate array 162, state table random access memory circuit 164, egress buffer circuit 166, and path verification dual port memory circuit 168. Alternatively, egress application interface circuit 88 may include additional discrete components or a single component, such as an application-specific integrated circuit.

Field programmable gate array 162 is coupled to state table random access memory circuit 164, egress buffer circuit 166, and path verification dual port memory circuit 168. Field programmable gate array 162 receives DS-0 data from a 10-bit parallel data stream, a channel synchronization stream, and a clock stream from time slot interchange switch circuit 86. Field programmable gate array 162 also receives address and control data from the onboard controller circuit of the application circuit associated with bus interface system 80.

State table dual port random access memory circuit 164 is a dual port random access memory that receives data from field programmable gate array 162. As each byte of state data is written to state table random access memory circuit 164, even parity is calculated and stored with the data. State table random access memory circuit 164 is used by the path verification function of field programmable gate array 162 to track the state of each stream relative to the bit position of the path verification bit stream.

Path verification dual port memory circuit 168 is a dual port random access memory that is read by field programmable gate array 162 and which can be written to by the onboard controller circuit. As each byte is written to path verification dual port memory circuit 168, even parity is calculated and stored with the data. Path verification dual port memory circuit 168 contains the path verification code data for each DS-0 data channel. It is compared with the path verification code received on each DS-0 data channel to verify that the proper connections were made through the system.

Egress buffer circuit 166 is a first-in/first-out buffer that receives and stores DS-0 data from field programmable gate array 162. The DS-0 data is transmitted to the application circuit associated with bus interface system 80 upon receipt of control data generated by the application circuit associated with bus interface system 80.

Figure 7:
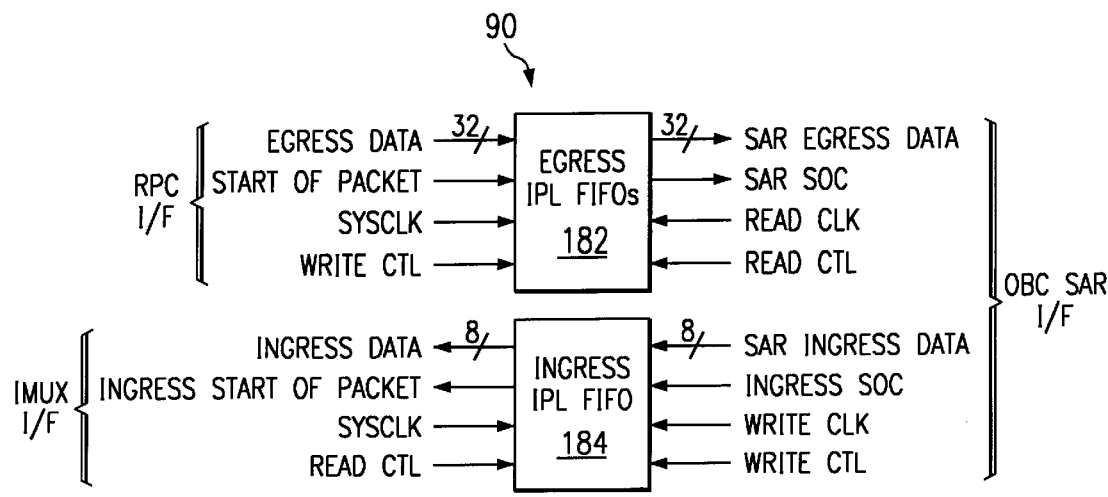
FIG. 7 is a block diagram of an iMPAX packet layer first-in, first-out buffer circuit embodying concepts of the present invention.

FIG. 7 is a block diagram of buffer circuit 90 embodying concepts of the present invention. Buffer circuit 90 comprises egress first-in/first-out buffer 182 and ingress first-in/first-out buffer 184. Alternatively, buffer circuit 90 may include additional discrete components or a single component, such as an application-specific integrated circuit.

Egress first-in/first-out buffer 182 and ingress first-in/first-out buffer 184 are first-in/first-out buffers that can store, for example, up to 1024 egress and ingress iMPAX packet layer datagrams. In addition, the egress iMPAX packet level datagrams are provided to the onboard controller segmentation and reassembly unit for the application circuit associated with bus interface system 80.

The onboard controller segmentation and reassembly unit also provides iMPAX packet layer datagrams to ingress first-in/first-out buffer 184. These datagrams are stored until they can be transmitted on ingress bus 60 by ingress multiplexer circuit 94, which controls the read operation of ingress first-in/first-out buffer 184.

Figure 8:
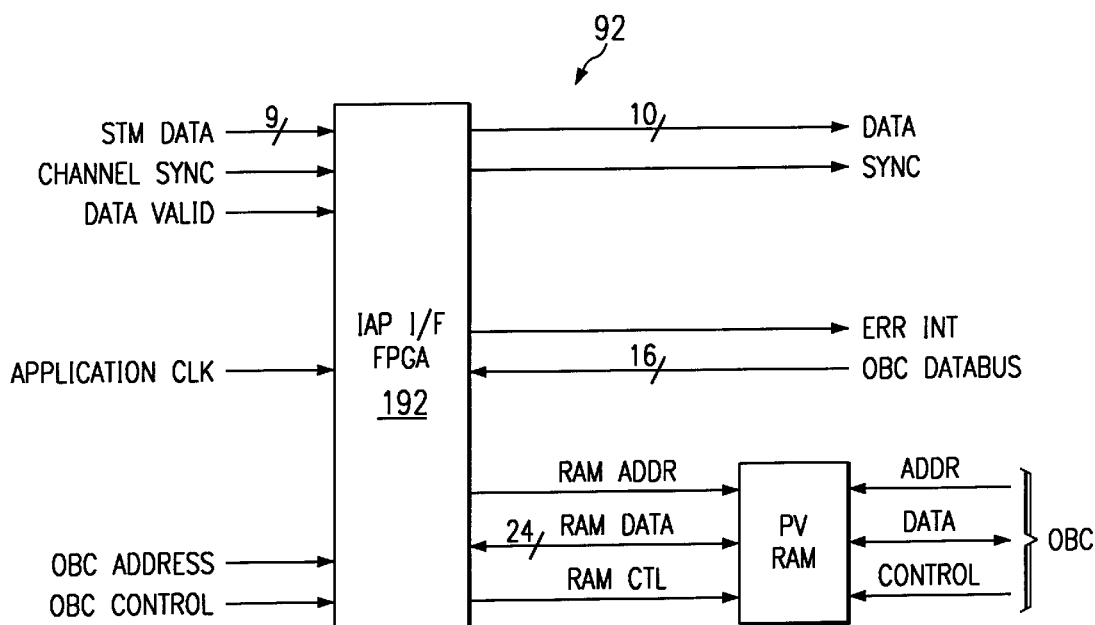
FIG. 8 is a block diagram of an ingress application interface circuit embodying concepts of the present invention.

FIG. 8 is a block diagram of ingress application interface circuit 92 embodying concepts of the present invention. Ingress application interface circuit 92 is a telecommunications data processing device that includes field programmable gate array 192 and dual port memory 194. Alternatively, ingress application interface circuit 92 may include additional discrete components or a single component, such as an application-specific integrated circuit.

Field programmable gate array 192 is a telecommunications data processing device, and may include an Altera field programmable gate array or other suitable components. Field programmable gate array 192 receives a 9-bit parallel data stream, a synchronization stream, a data validation stream, an application clock stream, an onboard controller address stream and an onboard controller control stream from the application circuit associated with bus interface system 80. Field programmable gate array 192 verifies parity over each byte of data, generates the path verification bit stream for each DS-0 data channel, generates parity over the 8-bit data and path verification bit, and concatenates the 8-bit data, path verification data, and parity data to form a ten-bit sample.

Dual pore memory 194 is a dual port random access memory that is used to store the path verification code for each DS-0 data channel. Dual port memory 194 is accessed by the onboard controller circuit through a separate port to allow the onboard controller circuit to update the path verification table without disturbing normal processing by field programmable gate array 192.

Figure 9:
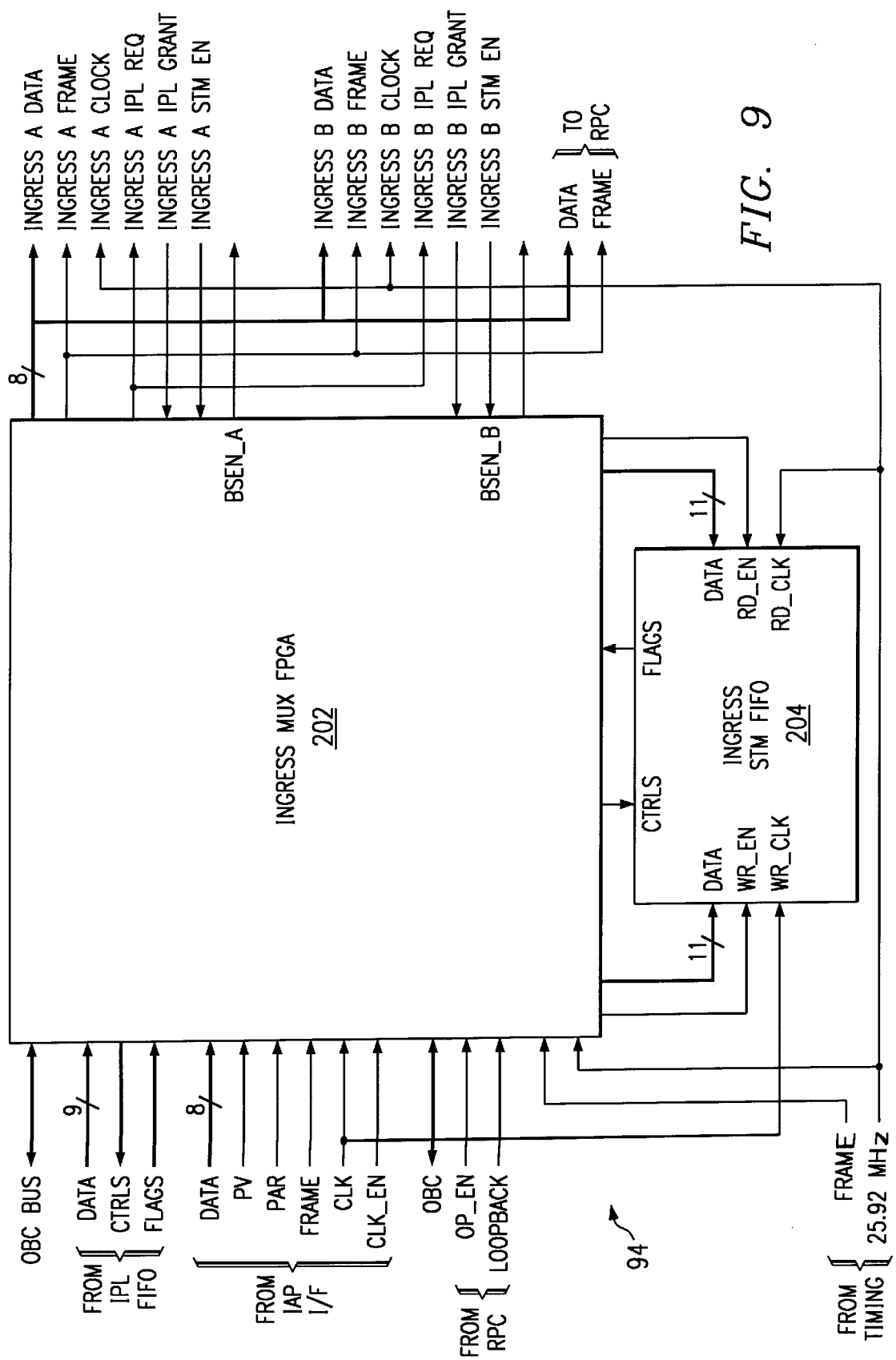
FIG. 9 is a block diagram of an ingress multiplexer circuit embodying concepts of the present invention.

FIG. 9 is a block diagram of ingress multiplexer circuit 94 embodying concepts of the present invention. Ingress multiplexer circuit 94 is a telecommunications data processing device that includes field programmable gate array 202 and first-in/first-out buffer 204. Ingress multiplexer circuit 94 may include other suitable components. Ingress multiplexer circuit 94 receives a data stream of outgoing synchronous transfer mode data and a data stream of outgoing asynchronous transfer mode data and combines the two data streams into a single outgoing data stream. Alternatively, ingress multiplexer circuit 94 may include additional discrete components or a single component, such as an application-specific integrated circuit.

Field programmable gate array 202 receives a 9-bit parallel data stream of asynchronous transfer mode data from buffer circuit 90 under control of control signals sent to buffer circuit 90 and flag signals received from buffer circuit 90. Field programmable gate array 202 also receives an 8-bit parallel data channel of synchronous transfer mode data, a path verification stream, a frame stream, a clock stream, a parity stream, and a clock enable stream from ingress application interface circuit 92. Field programmable gate array 202 monitors frame, parity, clock, and clock enable signals for the synchronous transfer mode data.

For the synchronous transfer mode data, field programmable gate array 202 monitors the incoming DS-0 data and writes it into first-in/first-out buffer 204 at the application clock rate. Field programmable gate array 202 reads the DS-0 data out of first-in/first-out buffer 204 according to a predetermined table of data at the system clock rate. The synchronous transfer mode data and asynchronous transfer mode data are multiplexed by transmitting synchronous transfer mode subframes in valid synchronous transfer mode bus slots according to a predetermined address correlation table, and by transmitting iMPAX packet layer datagrams in response to valid iMPAX packet layer grants from bus control circuit 44.

Arbitration errors are also monitored by all field programmable gate arrays of bus interface circuit 80, such as field programmable gate array 202. Synchronous transfer mode enables and iMPAX packet layer datagram grants asserted with an unexpected polarity will cause an arbitration error, as will synchronous transfer mode enable and iMPAX packet layer datagram grants asserted for the same bus slot or for an incorrect bus slot. The field programmable gate arrays also generate errors and patterns for diagnostic purposes.

Figure 10:
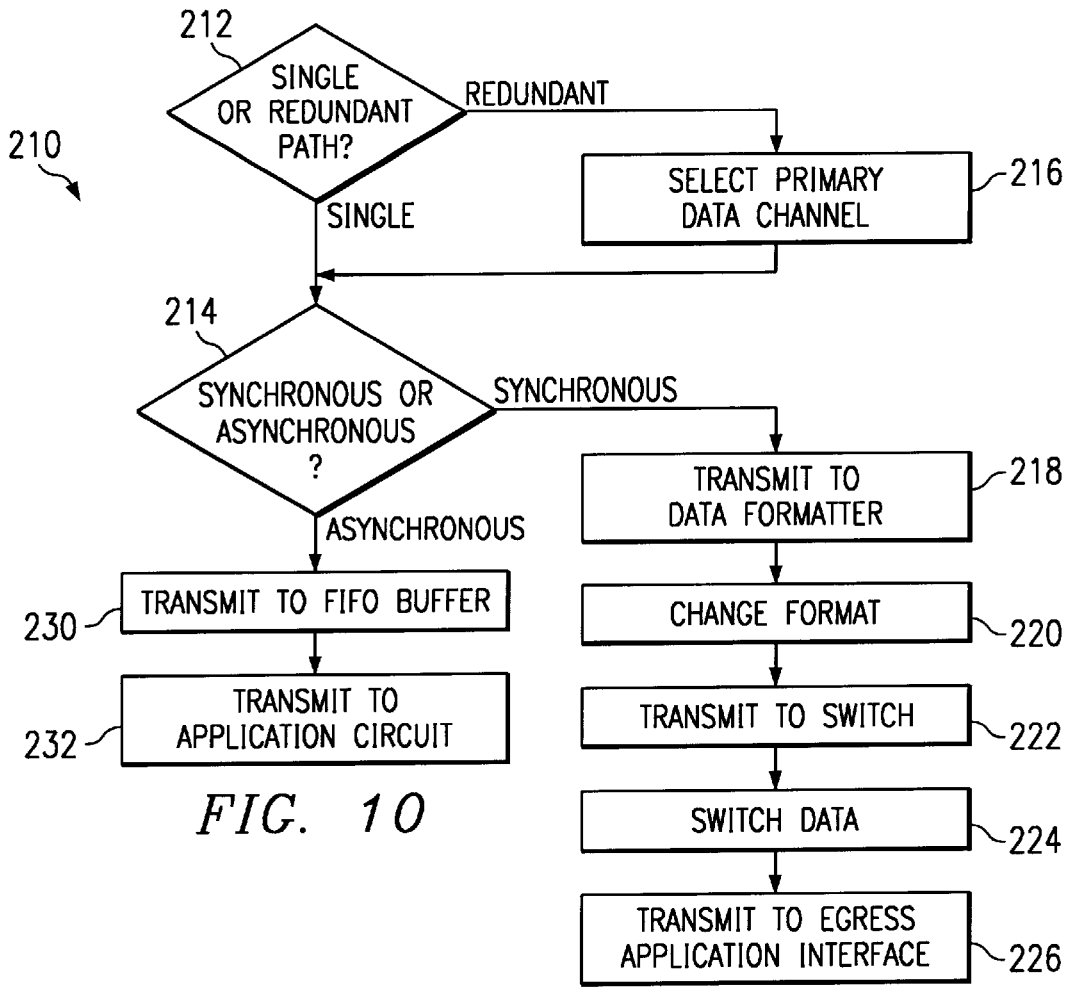
FIG. 10 is a flow chart of a method for interfacing application circuitry to data buses embodying concepts of the present invention.

FIG. 10 is a flow chart of a method 210 for interfacing application circuitry to data buses. Method 210 begins at step 212, where a redundant path combiner circuit determines whether a single first data stream of incoming synchronous transfer mode data and incoming asynchronous transfer mode data has been received from an egress data bus, or whether redundant first data streams have been received. If a single first data stream has been received, the method proceeds to step 214, where the redundant path combiner circuit determines whether the data is synchronous or asynchronous.

If redundant first streams of data have been received at step 212, the method proceeds to step 216, where one of the redundant first data streams is selected as the primary first data stream for the synchronous transfer mode data, and one of the redundant first data streams is selected as the primary first data stream for the asynchronous transfer mode data. As previously noted, the same redundant first data stream does not need to be selected for the synchronous and the asynchronous transfer mode data. The method then proceeds to step 214.

At step 214, it is determined whether the incoming data is synchronous or asynchronous. If the incoming data is synchronous, the method proceeds to step 218, where the data is transmitted to a data formatter circuit. The data formatter circuit changes the format of the incoming synchronous transfer mode data received from the redundant path combiner circuit at step 220, and transmits the incoming synchronous transfer mode data to a time slot interchange switch circuit at step 222. The time slot interchange circuit then time switches the incoming synchronous transfer mode data in response to control commands at step 224 and transmits the time-switched incoming synchronous transfer mode data to an egress application interface circuit at step 226.

If the incoming data is determined to be asynchronous at step 214, the method proceeds to step 230, where the incoming asynchronous transfer mode data is first validated to verify that there is a valid datagram addressed to the local application card. The incoming asynchronous transfer mode data is then transmitted to an iMPAX packet layer first-in/first-out buffer. At step 232, the asynchronous transfer mode data is transmitted to the application circuitry.

Figure 11:
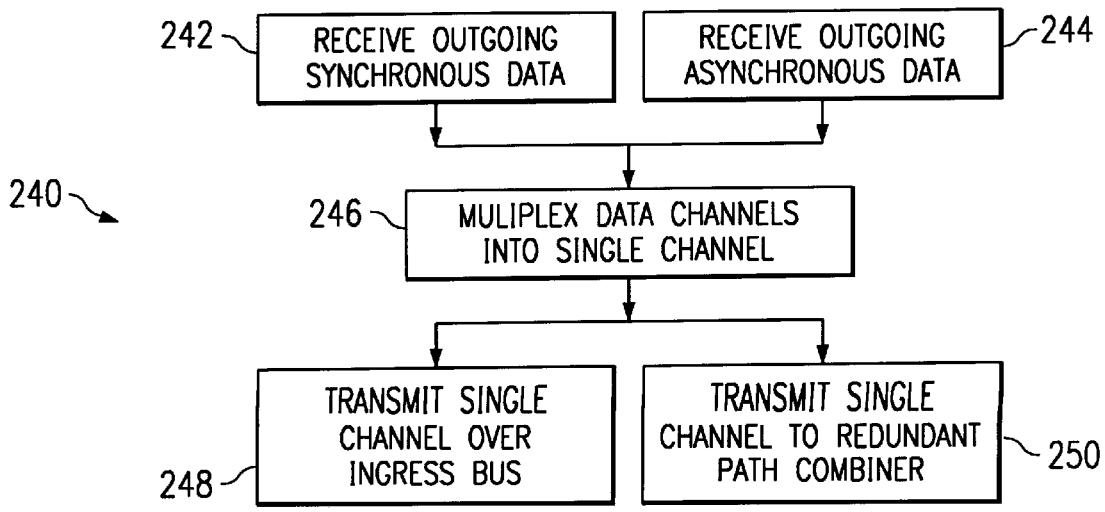
FIG. 11 is a flow chart of a method for interfacing application circuitry to data buses embodying concepts of the present invention.

FIG. 11 is a flow chart of a method 240 for interfacing application circuitry to data buses. Method 240 may be performed simultaneously with method 210 of FIG. 10 to effect transfer of data to and from application circuitry. At step 242, outgoing synchronous transfer mode data is received from the application circuitry over an ingress data bus. The outgoing asynchronous transfer mode data is received at step 244 from the application circuitry. The outgoing synchronous transfer mode data and the outgoing asynchronous transfer mode data are then multiplexed into a single outgoing data stream at step 246. At step 248, the single outgoing data stream is transmitted over the pair of redundant ingress data buses. In addition, the single outgoing data stream is transmitted to the redundant path combiner circuit at step 250 for loopback operations.

Figure 12:
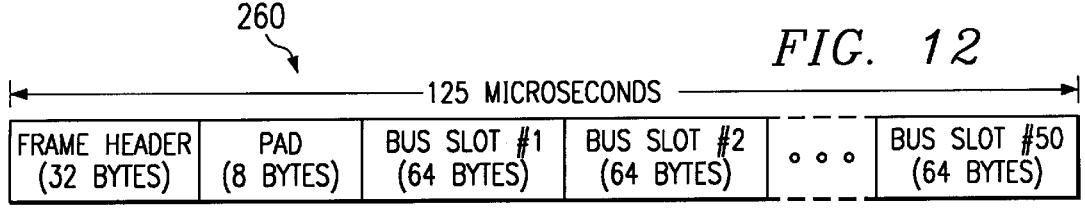
FIG. 12 is a diagram of an ingress bus frame format embodying concepts of the present invention.

FIG. 12 is a diagram of an ingress bus frame format 260 embodying concepts of the present invention. Data transmitted over ingress bus 60 may be encoded in the format of ingress bus frame format 260, or in other suitable formats.

Ingress bus frame format 260 has a period of 125 microseconds, and includes a frame header block comprising 32 bytes of data followed by an 8-byte pad data block. Ingress bus frame format 260 also includes fifty 64-byte bus slots. Each bus slot may be transmitted on an 8-bit wide data stream operating, for example, at a frequency of 25.92 MHZ, to provide a bandwidth of approximately 200 Mb/s. Other suitable data stream formats and frequencies may be used, including but not limited to a data stream having a width of any integer value between 1 and 128, a greater or lesser number of bus slots having a greater or lesser number of bytes, and operating frequencies between 10 kHz and 1000 MHZ, in 1 Hz increments.

Figure 13:
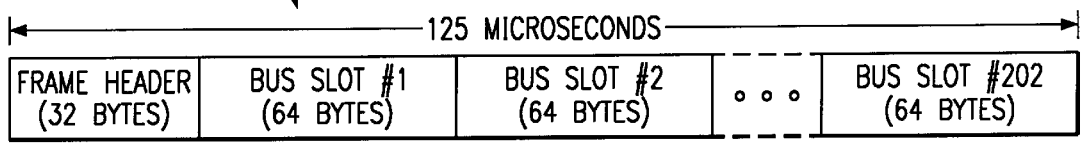
FIG. 13 is a diagram of an egress bus frame format embodying concepts of the present invention.

FIG. 13 is a diagram of an egress bus frame format 270 embodying concepts of the present invention. Data transmitted over egress bus 62 may be encoded in the format of egress bus frame format 270, or in other suitable formats.

Egress bus frame format 270 has a period of 125 microseconds, and includes a frame header block comprising 32 bytes of data. Egress bus frame format 270 also includes two hundred and two 64-byte bus slots. Each bus slot may be transmitted on a 16-bit wide data stream operating, for example, at a frequency of 51.84 MHZ, to provide a bandwidth of approximately 800 Mb/s. Other suitable data stream formats and frequencies may be used, including but not limited to a data stream having a width any integer value between 1 and 128, greater or lesser bus slots having a greater or lesser number of bytes, and operating frequencies between 10 kHz and 1000 MHZ, in 1 Hz increments.

Data transported on ingress buses 60 and egress buses 62 are organized into data frames having a time period of 125 microseconds with a frame header and a predetermined number of subframes or bus slots. Each bus slot carries a datagram containing 64 bytes of data. In particular, synchronous transfer mode datagrams carry DS-0 data. iMPAX packet layer datagrams carry asynchronous transfer mode data. An idle datagram is used for subframes that are not carrying synchronous transfer mode data or asynchronous transfer mode data.

Figure 14:
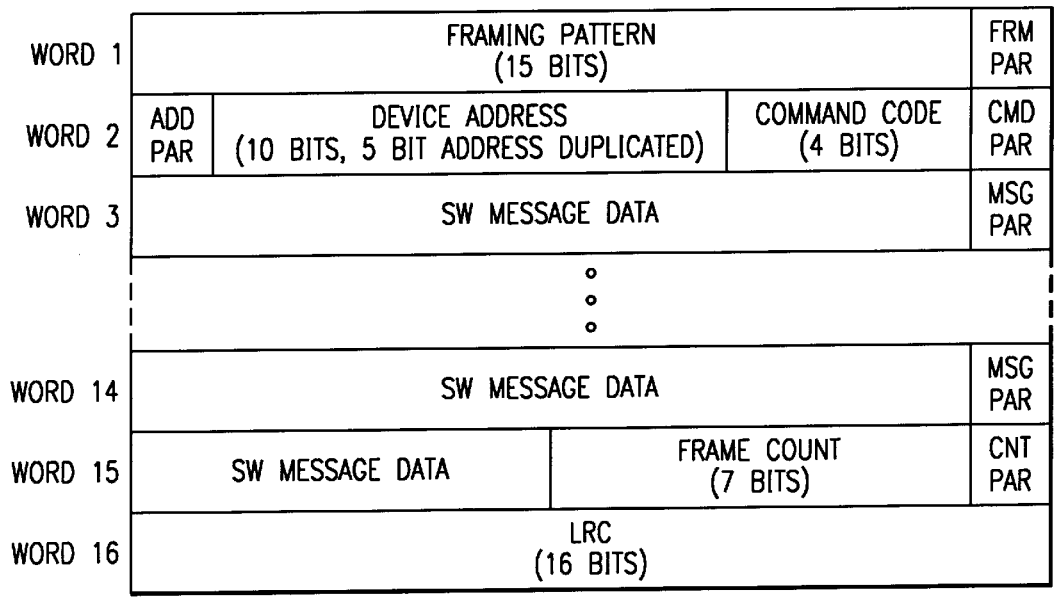
FIG. 14 is a diagram of a system building block frame header format embodying concepts of the present invention.

FIG. 14 is a diagram of a system building block frame header format 280 embodying concepts of the present invention. The frame header provides a 32 byte capacity and carries synchronization data, command data, and other suitable data. The 32 byte frame header is organized as sixteen 16-bit words. The first fifteen bits of word 1 contain a framing pattern field used by other telecommunications components to determine the system building block frame position. The device address field in word 2 is used to address devices to which a command or other suitable data is to be sent. Low level commands such as reset and restart are encoded into the command code field of word 2.

The command code field may contain a command that indicates that the software defined message field of word 3 through word 15 contains predetermined data for the addressed device. The software defined message field provides a 25 byte data capacity for such software defined messages. Additional frame header data includes a frame parity bit, an address parity bit, a command parity bit, message parity bits, frame count parity bits, a frame count field, and a longitudinal redundancy check field.

Figure 15:
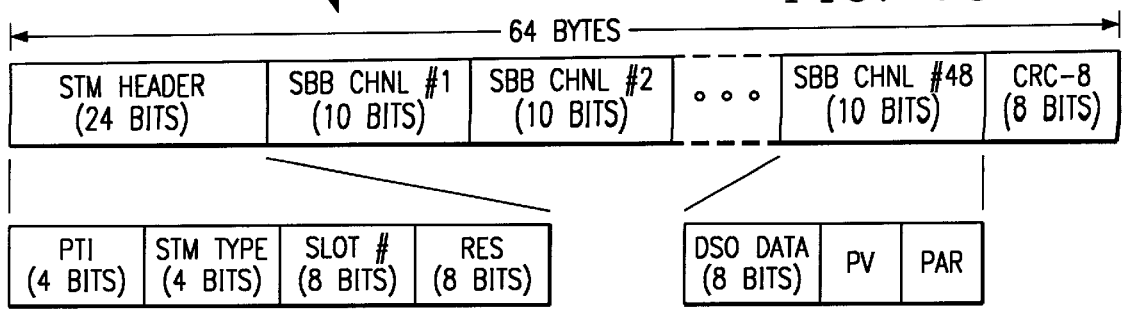
FIG. 15 is a diagram of a synchronous transfer mode subframe format embodying concepts of the present invention.

FIG. 15 is a diagram of a synchronous transfer mode subframe format 290 embodying concepts of the present invention. Synchronous transfer mode subframe format 290 may also be referred to as a synchronous transfer mode datagram. Data transmitted over the egress synchronous transfer mode interface of FIG. 2 may be encoded in the format of synchronous transfer mode subframe format 290, or in other suitable formats.

Synchronous transfer mode subframe format 290 has a 64 byte data structure, and includes a 24-bit synchronous transfer mode header. The 24-bit synchronous transfer mode header includes four bits of packet type indicator data that may be used to distinguish synchronous transfer mode datagrams, iMPAX packet layer datagrams, idle datagrams, and other suitable packet types. Eight bits of slot number data are used to identify the egress bus slot assigned to the datagram. Four bits of synchronous transfer mode type data and an 8-bit reserved field are also included in the 24-bit synchronous transfer mode header.

Synchronous transfer mode subframe format 290 also includes forty eight 10-bit channels of DS-0 data. In addition to eight bits of DS-0 data, each DS-0 channel includes a path verification bit and a parity bit. A unique path verification code is generated for each channel. The path verification codes may be 48 bits, with one bit transmitted per channel for every frame, such that one complete path verification code is transmitted for each channel every 48 frames.

Figure 16:
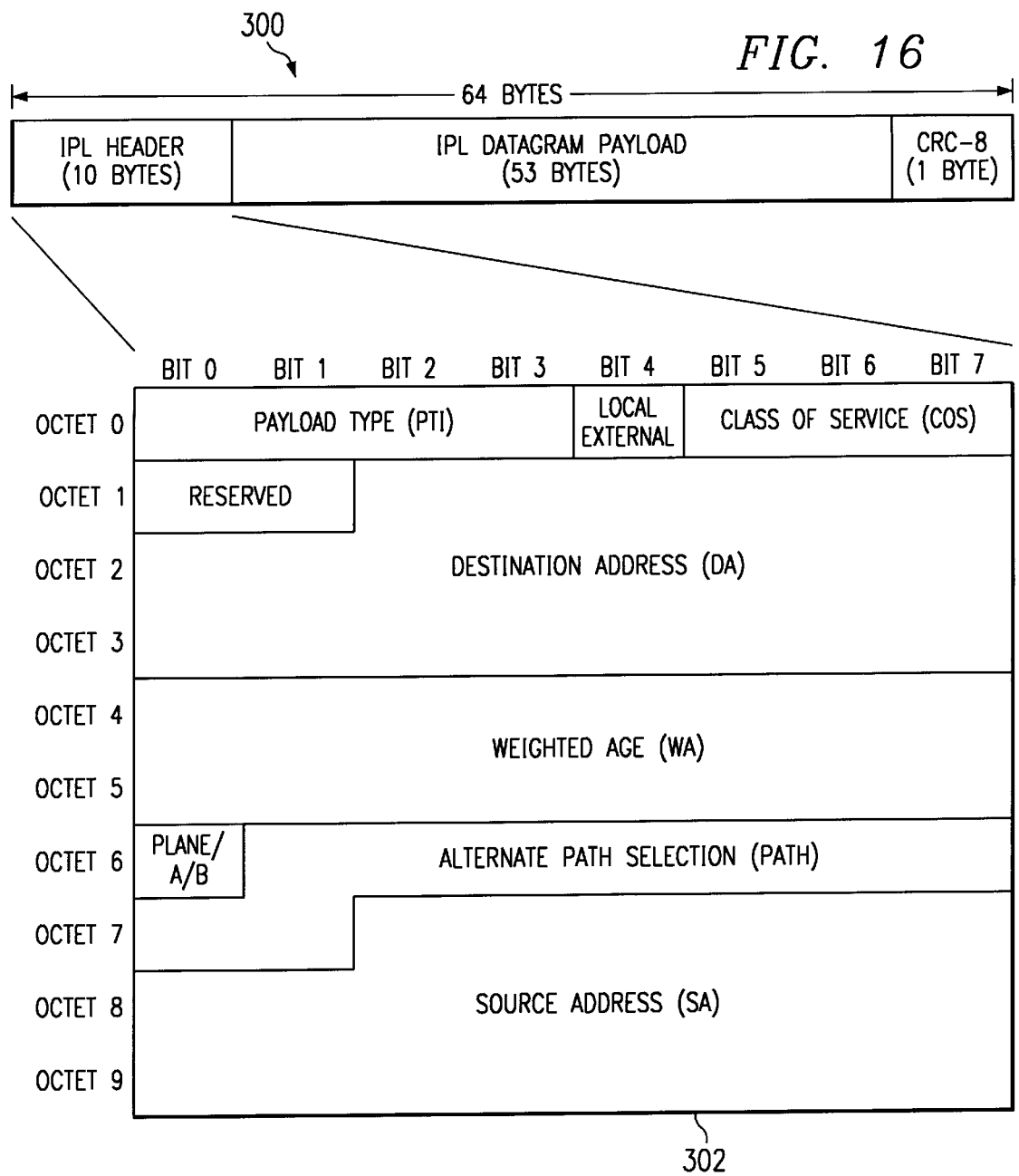
FIG. 16 is a diagram of an iMPAX packet layer subframe format embodying concepts of the present invention.

FIG. 16 is a diagram of an iMPAX packet layer subframe format 300 embodying concepts of the present invention. iMPAX packet layer subframe format 300 may also be referred to as an iMPAX packet layer datagram. Data transmitted over the egress iMPAX packet layer data interface of FIG. 2 may be encoded in the format of iMPAX packet layer subframe format 300, or in other suitable formats.

iMPAX packet layer subframe format 300 has a 64 byte data structure, and includes a 10-byte iMPAX packet layer header 302. Payload type data contained in octet 0 of iMPAX packet layer header 302 contains data that distinguishes iMPAX packet layer datagrams, synchronous transfer mode datagrams, idle datagrams, and other suitable packet types. Destination address data contained in octet 1 through octet 3 of iMPAX packet layer header 302 is used to route the iMPAX packet layer datagram to a destination. Source address data contained in octet 7 through octet 9 of iMPAX packet layer header 302 is used to identify the address of the processor sending the iMPAX packet layer datagram.

iMPAX packet layer subframe format 300 includes a 53-byte iMPAX packet layer payload. Data transported between processors may be larger than 53 bytes. Such data may be partitioned, and control data required for segmentation and reassembly may be carried in a secondary header located within the 53-byte iMPAX packet layer payload. The secondary header may be compatible with standardized asynchronous transfer mode data requirements. One byte of CRC-8 control record check data is also included in iMPAX packet layer subframe format 300.

Figure 17:
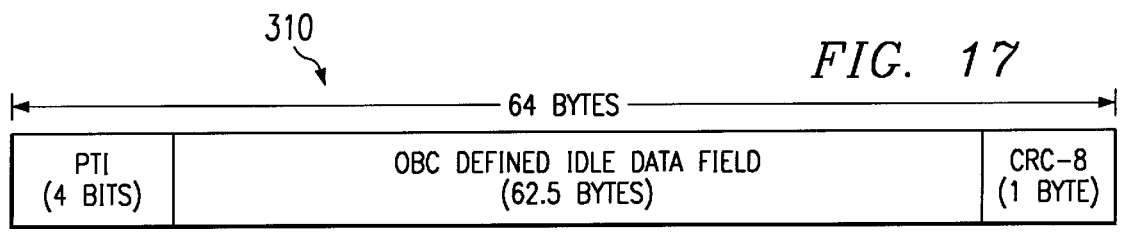
FIG. 17 is a diagram of an idle datagram format embodying concepts of the present invention.

FIG. 17 is a diagram of an idle datagram format 310 embodying concepts of the present invention. Data transmitted over ingress bus 60 or egress bus 62 may be encoded in the format of idle datagram format 310, or in other suitable formats.

Idle datagram format 310 has a 64 byte data structure, and includes a 4-bit packet type indicator that is used to identify the subframe as an idle datagram, and a 1-byte CRC-8 code. Idle datagram format 310 may be used to fill unused bus slots in ingress bus frame format 260 or egress bus frame format 270.

Figure 18:
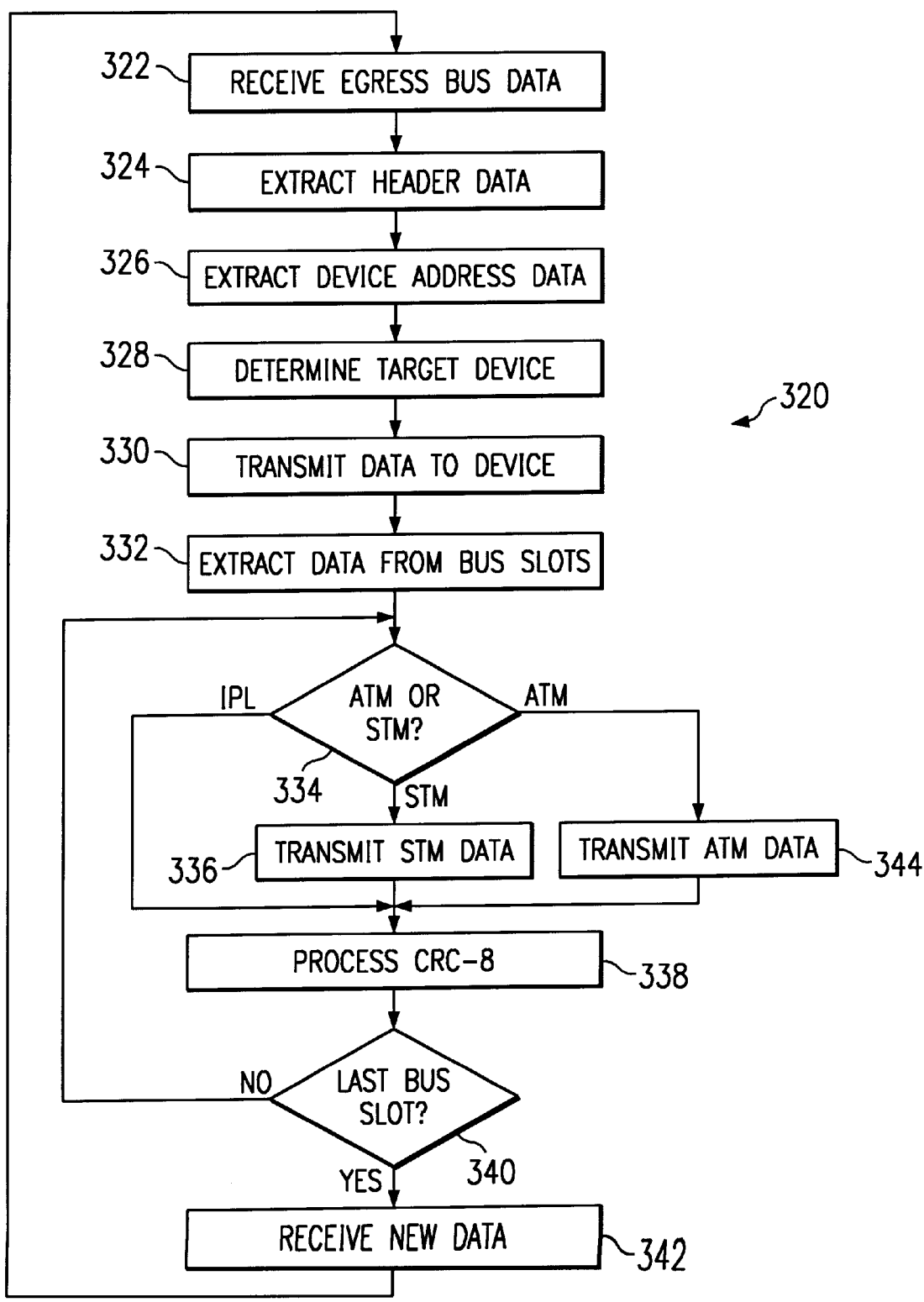
FIG. 18 is a method for interfacing with a data bus embodying concepts of the present invention.

FIG. 18 is a flow chart of a method 320 for interfacing with a data bus in accordance with the teachings of the present invention. Method 320 may be implemented with bus interface circuit 80 or with other suitable circuits or systems.

At step 322, one frame of egress bus data is received at an egress bus interface, such as redundant path combiner circuit 82 of FIG. 2. The method then proceeds to step 324, where synchronization data, low level commands, software defined commands, or other suitable data is extracted from the frame header data of the egress bus datagram.

At step 326, device address data is extracted from the frame header data. The device address data is used at step 328 to determine whether the synchronization data, low level commands, software defined commands, or other suitable data that has been extracted from the frame header data is to be transmitted to the associated application circuit. At step 330, the synchronization data, low level commands, software defined commands, or other suitable data is transmitted to the application circuit if the address received in step 326 is that of the associated application circuit.

At step 332, data is extracted from each of the bus slots of the egress bus datagram. At step 334, it is determined whether the bus slot data is a synchronous transfer mode datagram, an iMPAX packet layer datagram, or an idle datagram. If the bus slot data is determined to be a synchronous transfer mode datagram, the method proceeds to step 336.

At step 336, the synchronous transfer mode datagram is transmitted over an egress synchronous transfer mode interface, such as that shown in FIG. 2. The method then proceeds to step 338, where the CRC-8 code is processed for fault monitoring purposes. The method then proceeds to step 340, where it is determined whether the last bus slot has been processed. If the last bus slot has been processed, the method proceeds to step 342, where the next frame of egress bus data is received. The method then returns to step 322. If the last bus slot has not been processed, the method returns to step 334, where the next bus slot is processed.

If the bus slot data is determined to be an iMPAX packet layer datagram at step 334, the method proceeds to step 344. At step 344, the iMPAX packet layer datagram is transmitted over an iMPAX packet layer interface, such as that shown in FIG. 2. The method then proceeds to step 338. If the bus slot data is determined to be an idle datagram at step 334, the method proceeds to step 338.

Figure 19:
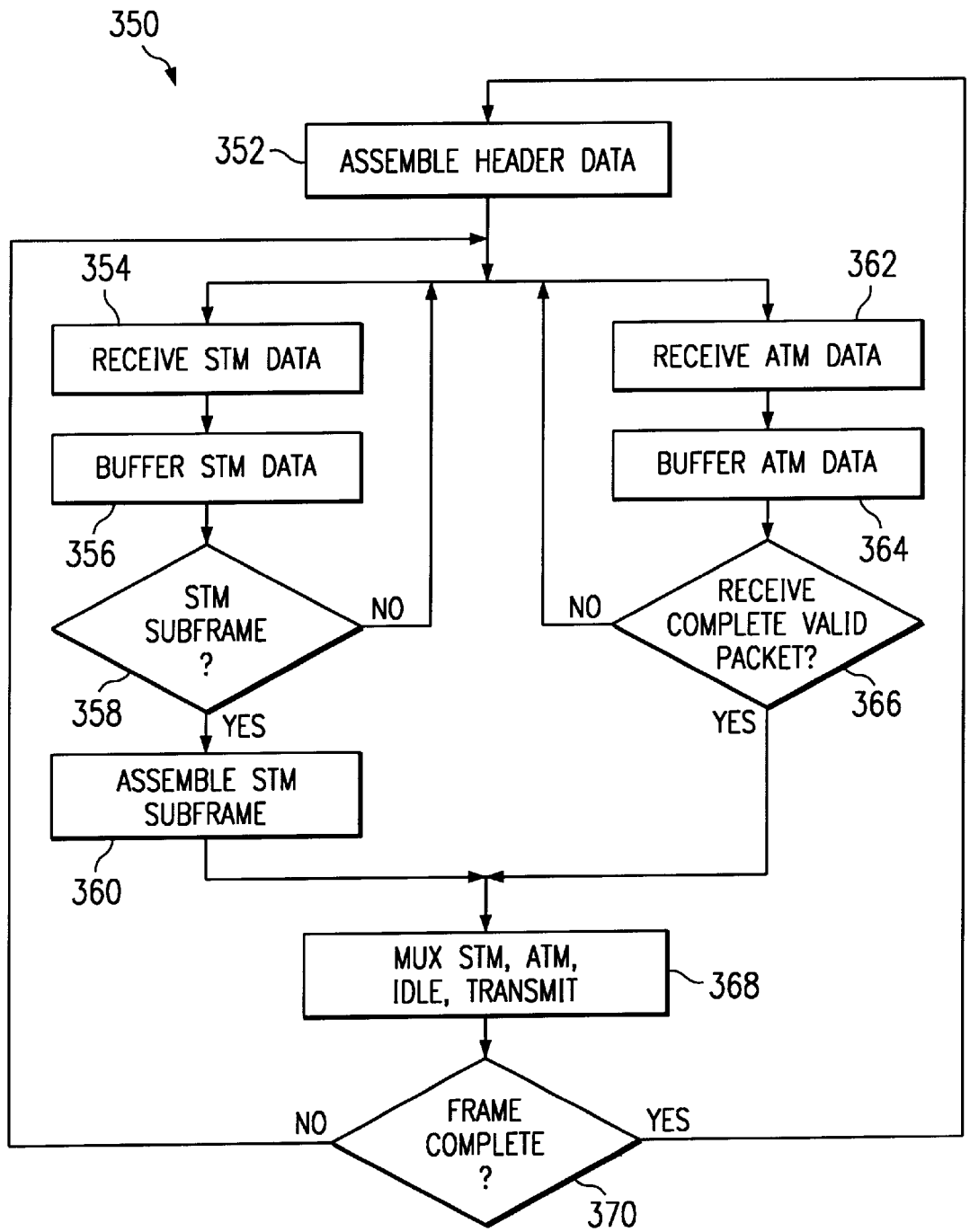
FIG. 19 is a method for interfacing with a data bus embodying concepts of the present invention.

FIG. 19 is a flow chart of a method 350 for interfacing with a data bus in accordance with the teachings of the present invention. Method 350 may be implemented with bus interface circuit 80 or with other suitable circuits or systems.

Method 350 begins at step 352, where header data is assembled. The method then proceeds to step 354, where synchronous transfer mode DS-0 data is received at an ingress synchronous transfer mode interface, such as that shown in FIG. 2. The synchronous transfer mode data is stored in a buffer at step 356, and the method proceeds to step 358.

At step 358, it is determined whether sufficient synchronous transfer mode data has been received to assemble a synchronous transfer mode data subframe, such as synchronous transfer mode subframe format 290 of FIG. 15. If there is not sufficient data, then the method returns to step 354. Otherwise, the method proceeds to step 360, where the synchronous transfer mode subframe is assembled. The method then proceeds to step 368.

Concurrent with the process of steps 354 through 360, asynchronous transfer mode data is received at step 362. The asynchronous transfer mode data is stored in a buffer at step 364. The method then proceeds to step 366, where it is determined whether a complete asynchronous transfer mode data packet has been received, such as iMPAX packet layer subframe format 300 of FIG. 16. If a complete asynchronous transfer mode data packet has not been received at step 366, the method returns to step 362. Otherwise, the method proceeds to step 368.

At step 368, the synchronous transfer mode datagrams, iMPAX packet layer datagrams, and idle datagrams are multiplexed for transmission over egress bus 62. The method then proceeds to step 370, where it is determined whether a complete egress bus frame has been transmitted. If a complete egress bus frame has been transmitted, the method returns to step 352. Otherwise, the method returns to steps 354 and 362 for collection of additional datagrams.

In operation, incoming data that includes synchronous transfer mode data and asynchronous transfer mode data is received from a pair of redundant egress buses 62 at the bus interface system 80 associated with an application. The incoming synchronous transfer mode data is separated from the incoming asynchronous transfer mode data on a slot-by-slot basis. Synchronous transfer mode data is reformatted from packets to single DS-0 data channels. A first data stream that includes only incoming synchronous transfer mode data is transmitted to the application circuit, and a second data stream that includes only incoming asynchronous transfer mode data is transmitted to the application circuit. The synchronous transfer mode data and asynchronous transfer mode data are then processed in a predetermined manner by the application circuit.

A data stream of outgoing synchronous transfer mode data and a data stream of outgoing asynchronous transfer mode data are transmitted from the application circuit to bus interface system 80. These outgoing data streams are multiplexed into a single outgoing data stream that includes both outgoing synchronous transfer mode data and outgoing asynchronous transfer mode data. The single outgoing data stream is then transmitted over the pair of redundant ingress data buses 60, and is also provided to the input to bus interface system 80 for loopback testing.

The present invention provides many important technical advantages. One important technical advantage of the present invention is a data bus interface circuit that allows synchronous transfer mode data and asynchronous transfer mode data to be transmitted over one bus. Another important technical advantage of the present invention is a data bus interface circuit that transmits and receives synchronous transfer mode data at a rate determined by the application circuit that it is servicing. Another important technical advantage of the present invention is a system for interfacing with a data bus that allows selected data from the outgoing data stream to be fed back into the incoming data stream, thus allowing the functionality of the data bus interface system to be tested from an internal interface.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A system for interfacing with a data bus comprising:

an egress bus data interface operable to receive a pair of single incoming streams, each pair of single incoming streams including both synchronous transfer mode data and asynchronous transfer mode data, the egress bus data interface operable to separately transmit a first incoming stream of asynchronous transfer mode data each from a selected one of the pair of single incoming streams, wherein one of the pair of single incoming streams selected for transmitting synchronous transfer mode data from is either a same single incoming stream as or a different single incoming stream than one of the pair of single incoming streams selected for transmitting asynchronous transfer mode data from; and an ingress bus data interface coupled to the egress bus data interface, the ingress bus data interface operable to receive a first outgoing stream of synchronous transfer mode data and a second outgoing stream of asynchronous transfer mode data and to transmit a pair of single outgoing streams each including both synchronous transfer mode data and asynchronous transfer mode data therefrom, wherein the first incoming stream of synchronous transfer mode data comprises a plurality of synchronous transfer mode datagrams, wherein each of the plurality of synchronous transfer mode datagrams comprises a synchronous transfer mode header, a plurality of DS0 data channels, and eight bits of CRC-8 data.

2. A system for interfacing with a data bus comprising:

an egress bus data interface operable to receive a pair of single incoming streams, each pair of single incoming streams including both synchronous transfer mode data and asynchronous transfer mode data, the egress bus data interface operable to separately transmit a first incoming stream of asynchronous transfer mode data each from a selected one of the pair of single incoming streams, wherein one of the pair of single incoming streams selected for transmitting synchronous transfer mode data from is either a same single incoming stream as or a different single incoming stream than one of the pair of single incoming streams selected for transmitting asynchronous transfer mode data from; and an ingress bus data interface coupled to the egress bus data interface, the ingress bus data interface operable to receive a first outgoing stream of synchronous transfer mode data and a second outgoing stream of asynchronous transfer mode data and to transmit a pair of single outgoing streams each including both synchronous transfer mode data and asynchronous transfer mode data therefrom, wherein the first outgoing stream of synchronous transfer mode data comprises a plurality of synchronous transfer mode datagrams, wherein each synchronous transfer mode datagrams comprises a synchronous transfer mode header, a plurality of DS0 data channels, and eight bits of CRC-8 data.

3. A system for interfacing with a data bus comprising:

an egress bus data interface operable to receive a plurality of egress bus frames over a pair of incoming streams and to separately transmit incoming synchronous transfer mode datagrams and incoming proprietary packet layer datagrams each from a selected one of the pair of incoming streams, wherein one of the pair of incoming streams selected for transmitting incoming synchronous transfer mode datagrams from is either a same single incoming stream as or a different single incoming stream than one of the pair of incoming streams selected for transmitting proprietary packet layer datagrams; and an ingress bus data interface operable to receive a plurality of outgoing synchronous transfer mode datagrams and a plurality of outgoing proprietary packet layer datagrams and to transmit a plurality of ingress bus frames therefrom over a pair of outgoing streams, wherein each synchronous transfer mode datagram comprises a synchronous transfer mode header, a plurality of DS0 data channels, and eight bits of CRC-8 data.

4. A method for interfacing with a data bus comprising:

receiving a plurality of egress bus frames over a pair of single incoming streams;

separating synchronous transfer mode data and asynchronous transfer mode data from each of the egress bus frames of each single incoming stream;

transmitting the synchronous transfer mode data over a first data bus from a selected one of the pair of single incoming streams;

transmitting the asynchronous transfer mode data over a second data bus from a selected one of the pair of single incoming streams, one of the pair of single incoming streams selected for transmitting the asynchronous transfer mode data from is either a same single incoming stream as or a different single incoming stream than one of the pair of single incoming streams selected for transmitting the synchronous transfer mode data, wherein separating the synchronous transfer mode data and the asynchronous transfer mode data from each of the egress bus frames of each single incoming stream further comprises:

determining whether a bus slot of the egress bus frame contains a synchronous transfer mode datagram or a proprietary packet layer datagram;

storing the synchronous transfer mode datagrams to a first buffer; and storing the proprietary packet layer datagrams to a second buffer.

* * * * *